United States Patent
Compton et al.

(10) Patent No.: US 10,216,641 B2
(45) Date of Patent: Feb. 26, 2019

(54) MANAGING AND SHARING ALIAS DEVICES ACROSS LOGICAL CONTROL UNITS

(71) Applicant: INTERNATIONAL BUSINESS MACHINES CORPORATION, Armonk, NY (US)

(72) Inventors: Scott B. Compton, Hyde Park, NY (US); Tri M. Hoang, Poughkeepsie, NY (US); Stephen M. Kocik, Red Hook, NY (US); Dale F. Riedy, Poughkeepsie, NY (US); Harry M. Yudenfriend, Poughkeepsie, NY (US)

(73) Assignee: INTERNATIONAL BUSINESS SYSTEMS CORPORATION, Armonk, NY (US)

( * ) Notice: Subject to any disclaimer, the term of this patent is extended or adjusted under 35 U.S.C. 154(b) by 0 days.

(21) Appl. No.: 15/405,813

(22) Filed: Jan. 13, 2017

(65) Prior Publication Data
US 2018/0203803 A1    Jul. 19, 2018

(51) Int. Cl.
*G06F 9/52* (2006.01)
*G06F 12/10* (2016.01)

(52) U.S. Cl.
CPC ............ *G06F 12/10* (2013.01); *G06F 9/52* (2013.01); *G06F 2212/154* (2013.01); *G06F 2212/65* (2013.01)

(58) Field of Classification Search
CPC ...... G06F 12/10; G06F 9/52; G06F 2212/154; G06F 2212/65
See application file for complete search history.

(56) References Cited

U.S. PATENT DOCUMENTS 6,167,459 A * 12/2000 Beardsley ............ G06F 13/102
                                                     711/202
6,185,638 B1 * 2/2001 Beardsley ............ G06F 13/387
                                                     711/112

(Continued)

OTHER PUBLICATIONS

Anonymous, ip.com, Share Maps: An Application Independent Mechanism for Socially Combining Network Domains, IPCOM000243494D, published Sep. 24, 2015, pp. 1-5.

(Continued)

*Primary Examiner* — Aracelis Ruiz
(74) *Attorney, Agent, or Firm* — Cantor Colburn LLP; William Kinnaman

(57) ABSTRACT

Aspects include a computer-implemented method for managing alias devices across logical control units. Aspects include establishing one or more alias management groups associated with a set of one or more logical control units. Aspects also include responsive to one or more changes to the set of network paths of a first logical control unit in the set of logical control units performing a method comprising: marking a first alias management group associated with the first logical control unit as invalid for alias borrowing. Then, performing a first synchronized CPU enablement operation that ensures each of the plurality of CPUs has enabled. Aspects include determining whether a second alias management group exists having a second set of control units that matches the set of paths of the first control unit and associating the first control unit with the second alias management group.

20 Claims, 9 Drawing Sheets

(56) References Cited

U.S. PATENT DOCUMENTS

| | | |
|---|---|---|
| 6,453,392 B1 | 9/2002 | Flynn, Jr. |
| 6,622,177 B1 | 9/2003 | Eilert et al. |
| 6,973,586 B2 | 12/2005 | Petersen et al. |
| 7,516,284 B2 | 4/2009 | Norberg et al. |
| 7,702,879 B2 | 4/2010 | Yudenfriend et al. |
| 2001/0014097 A1 | 8/2001 | Beck et al. |
| 2016/0088067 A1 | 3/2016 | De Magalhaes |

OTHER PUBLICATIONS

Anonymous, ip.com, System for Keeping Aliases Updated, IPCOM000228182D, published Jun. 11, 2013, pp. 1-3.
Susan K. Candelaria, "Sharing Alias Addresses Among Logical Devices", U.S. Appl. No. 15/176,011, filed Jun. 7, 2016.
Susan K. Candelaria, "Sharing Alias Addresses Among Logical Devices", U.S. Appl. No. 15/176,021, filed Jun. 7, 2016.

\* cited by examiner

MANAGING AND SHARING ALIAS DEVICES ACROSS LOGICAL CONTROL UNITS

BACKGROUND

The present disclosure relates generally to a method, system, and computer program product for managing and sharing alias devices across logical control units.

In certain computing environments, multiple host systems may communicate with multiple control units (CUs) (also known as storage controllers, storage subsystems, enterprise storage servers, etc.) through one or more logical paths providing access to interconnected storage devices, such as hard disk drives or solid-state storage drives (SSDs). The interconnected drives may be configured as a Direct Access Storage Device (DASD), Redundant Array of Independent Disks (RAID), Just a Bunch of Disks (JBOD), etc. The control unit may configure one or more logical subsystems (LSSs), where each LSS may be configured to include multiple volumes.

The host system may include a channel subsystem that maintains information to access logical volumes in the control unit. The channel subsystem includes subchannels, which provides state tracking for the execution of the I/O operations issued to a logical volume and provides information on the logical paths connecting the channel subsystem to the control unit and on the unit address of the logical volume on each logical path. The host operating system maintains a unit control block (UCB) providing information on the logical volume and the subchannel number that the channel subsystem uses to access the logical volume. When a control unit supports alias addressing, the unit address on a logical path associated with a logical volume is referred to as a base address. Other unit addresses on a logical path may be configured that are referred to as alias addresses and may be used as an alternate unit address to issue an I/O request to a logical volume. The host operating system can distinguish which unit address are base address and which are alias addresses by self-description information provided to I/O requests issued to the unit address.

In a static implementation, the customer may initially assign aliases to bases via external tools to the control unit and the aliases are used for I/O requests directed to the bases to which they are assigned. A static implementation may also provide a way for a customer or the host operating system to reassign an alias to a new base. When reassignment is performed, the alias provides notification to the host program that it has changed its base assignment. In another implementation, the alias addresses do not have a fixed affinity to a particular base address, and the base address is selected through a command at the beginning of an I/O request. In these implementations, the base addresses that can be selected through the alias address are limited to bases on the same logical subsystem (LSS, also known as control unit image) on the control unit. This allows one alias address to have I/O operations (from different hosts) in progress concurrently.

The host processes the information in the UCB to address an I/O operation to a logical volume. In particular, the host initiates an I/O operation toward a logical volume by initiating a channel program which consists of a series of channel command words (CCWs), each of which may contain a command to be issued to the logical volume.

A base unit address is associated with a logical volume when it is configured on the control unit. After assigning a base address to each logical volume (device), the remaining addresses can be allocated as alias addresses. Depending on the implementation, either the alias has an associated base (static implementation), or the alias has some scope of bases that can be selected by a command issued at the beginning of an I/O operation. The control unit associates a given I/O request issued to a base address or an alias address with one and only one logical volume.

One or more I/O operations can be simultaneously issued to the same logical volume using the base address and one or more alias unit addresses for the logical volume. In this way, the issued I/O requests are all directed to the same logical volume using different addresses, wherein each address may be accessed by the channel subsystem through one or more logical paths. This allows a single host to concurrently execute multiple I/O operations against a single volume. In a static implementation, the number of aliases provided for a base may be set according to the expected or measured number of concurrent I/O requests for the logical volume. In certain cases, only a few aliases may be needed to accommodate network, e.g., Storage Area Network (SAN), traffic for a particular logical volume.

In a dynamic implementation, the number of aliases provided for a set of bases that can be selected through the set of aliases can be set according to the number of concurrent I/O requests for the set of logical volumes. Since the aliases can be dynamically assigned on a per I/O basis, the average number of aliases per volumes is generally significantly less than for static alias assignments.

The host operating system is aware of which subchannels are associated with a base address and which subchannels are associated with alias addresses. It is also aware of which alias addresses can be used to issue I/O requests to which logical volumes. And it is also aware whether an alias address is static or dynamic. When the alias address is dynamic, the host operating system preprocesses any I/O request by prefixing an appropriate command to the channel program to select the logical volume that the I/O request is being issued to. When the host operating system receives an I/O request for a logical volume, the host program selects one of the subchannels that can be used for the logical volume to issue the I/O request. The host program may use one or more algorithms to select the applicable subchannel. For example, it might use a round robin selection scheme that skips subchannels that are already busy with existing I/O operations. If no subchannels are available, the host operating system queues the I/O request for the logical volume until a subchannel becomes available. Once the I/O operation is issued to the subchannel, the channel subsystem selects a logical path associated with the subchannel to issue the I/O request to the unit address on the control unit associated with the subchannel. Once the I/O request has ended at the logical volume, the control unit presents status to the channel subsystem and the subchannel provides the host program with information describing the completion status of the I/O request.

SUMMARY

According to embodiments, a system for managing alias devices across logical control units is described. The system includes establishing, by a thread in a host system, one or more alias management groups associated with a set of one or more logical control units, wherein each logical control unit is associated with one or more devices, wherein each logical control unit in the set of one or more logical control units associated with an alias management group share a set of network paths, and wherein the one or more devices are being accessed for read/write requests by one or more operating systems operating on a plurality of central processing units (CPUs) in the host system. The method, then, includes responsive to one or more changes to the set of network paths of a first logical control unit in the set of logical control units performing a method comprising: marking a first alias management group associated with the first logical control unit as invalid for alias borrowing and performing, by the thread, a first synchronized CPU enablement operation, wherein the first synchronized CPU enablement operation ensures each of the plurality of CPUs has enabled. The method then includes determining whether a second alias management group exists, the second alias management group includes a second set of control units having a set of paths that matches the set of paths of the first control unit and responsive to determining the second alias management group exists, associating the first control unit with the second alias management group.

In accordance with an embodiment of the invention, a computer implemented method for managing alias devices across logical control units is described. The method includes establishing, by a thread in a host system, one or more alias management groups associated with a set of one or more logical control units, wherein each logical control unit is associated with one or more devices, wherein each logical control unit in the set of one or more logical control units associated with an alias management group share a set of network paths, and wherein the one or more devices are being accessed for read/write requests by one or more operating systems operating on a plurality of central processing units (CPUs) in the host system. The method, then, includes responsive to one or more changes to the set of network paths of a first logical control unit in the set of logical control units performing a method comprising: marking a first alias management group associated with the first logical control unit as invalid for alias borrowing and performing, by the thread, a first synchronized CPU enablement operation, wherein the first synchronized CPU enablement operation ensures each of the plurality of CPUs has enabled. The method then includes determining whether a second alias management group exists, the second alias management group includes a second set of control units having a set of paths that matches the set of paths of the first control unit and responsive to determining the second alias management group exists, associating the first control unit with the second alias management group.

In accordance with another embodiment of the invention, a computer program product for managing alias devices across logical control units is described. The computer program product comprises a computer readable storage medium having program instructions embodied therewith, the program instructions executable by a processor located on a device to cause the computer processor to perform a method. The method includes establishing, by a thread in a host system, one or more alias management groups associated with a set of one or more logical control units, wherein each logical control unit is associated with one or more devices, wherein each logical control unit in the set of one or more logical control units associated with an alias management group share a set of network paths, and wherein the one or more devices are being accessed for read/write requests by one or more operating systems operating on a plurality of central processing units (CPUs) in the host system. The method, then, includes responsive to one or more changes to the set of network paths of a first logical control unit in the set of logical control units performing a method comprising: marking a first alias management group associated with the first logical control unit as invalid for alias borrowing and performing, by the thread, a first synchronized CPU enablement operation, wherein the first synchronized CPU enablement operation ensures each of the plurality of CPUs has enabled. The method then includes determining whether a second alias management group exists, the second alias management group includes a second set of control units having a set of paths that matches the set of paths of the first control unit and responsive to determining the second alias management group exists, associating the first control unit with the second alias management group.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

The evolution of parallel access volumes (PAV) has gone from static PAV to dynamic PAV to HyperPAV. With HyperPAV, clients are able to reduce the defined number of alias devices by an order of magnitude because aliases are used in a more efficient manner. Clients that had a constraint related to a number of devices (only 64 K devices are allocatable on each system) could then re-purpose the number of devices previously assigned to aliases for base devices (base volumes). With this reduction in aliases devices defined on each system, peak I/O times may experience I/O Queue Time (IOSQ). Adding aliases to manage for peak I/O load in each logical control unit could address this. The number of aliases to add could be calculated utilizing Little's law: # Aliases=Peak I/Os per CU per second×Average Service Time.

The number of aliases may be doubled as a contingency. As an example, a control unit with 10000 I/Os per second, with an average response time of 1 ms, could expect to have 10 aliases defined. As mentioned above, for 10 aliases, a client may actually define 20 (i.e. double) or the client can round up to a binary number such as 24 or 32. Having a smaller number of aliases defined is optimal for most time; however, IOSQ time may still be encountered during peak I/O periods. Defining more aliases is not ideal for addressing this issue because it consumes devices constrained by a number of device spaces, it also consumes common storage (for control blocks representing additional devices), and it causes device scans to require more time because more devices are defined. Another issue is that when a client defines a large number of aliases on each control unit, the aliases are underused due to the over configuration for normal I/O loads. System resources can be better utilized if resources can be shared across control units.

Figure 1:
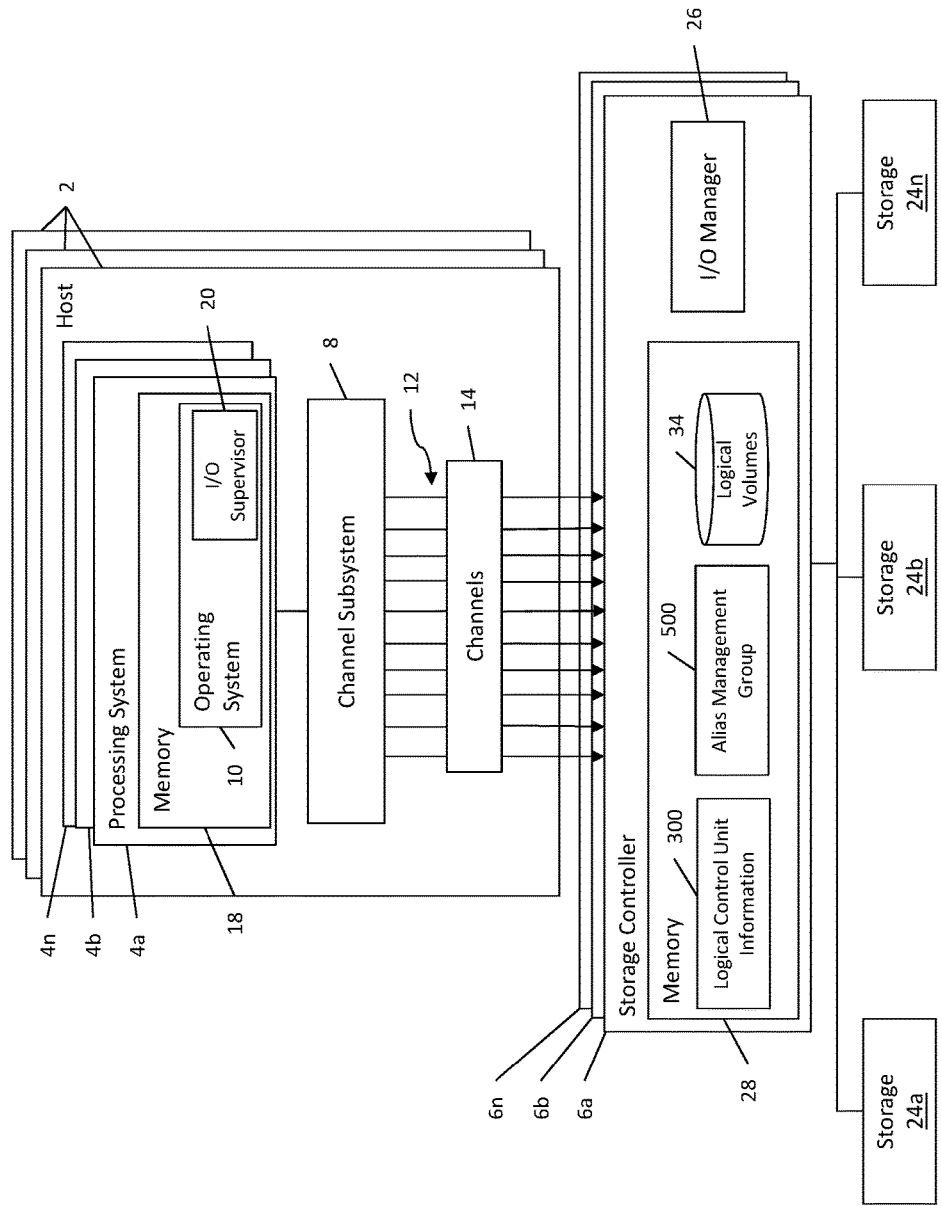
FIG. 1 illustrates an embodiment of a computing environment.

FIG. 1 illustrates an embodiment of a computing environment. One or more hosts 2) include one or more processing systems 4a, 4b . . . 4n (including central electronics complex (CEC)) that communicate Input/Output (I/O) requests to one or more storage controllers 6, 6a . . . 6n through a channel subsystem 8 that connects through a plurality of logical paths to the one or more storage controllers 6a . . . 6n. A storage controller is a computing system that manages storage devices, such as network attached storage device 24a, 24b . . . 24n. In the memory 28, the storage controller can virtualize and create the one or more logical volumes 34. While only one logical volume 34 is shown in the illustrative example, one of ordinary skill in the art can appreciate there being a plurality of logical volumes that can be created and virtualized in the memory 28. Each processing system 4a, 4b . . . 4n includes a memory 18 executing an operating system 10 to manage path related operations. The one or more hosts 2 may exploit a central electronics complex (CEC) architecture. The one or more processing system 4a, 4b . . . 4n can operate on one or more central processing units (CPUs) (not shown).

The channel subsystem 8 manages logical paths 12 which are accessed through channels 14. A channel 14 provides the physical layer through which logical paths 12 extend to the storage controller 6a or multiple storage controllers 6b . . . 6n through one or more switches (not shown). The operating system 10 may further associate multiple logical paths 12 with a path group such that the channel subsystem 8 may select which of the logical paths in the path group are used to communicate with the one or more storage controllers 6a, 6b . . . 6n. Path groups used by one operating system 10 may be identified by a unique path group identifier (PGID). The operating system 10 may issue an I/O command (such as a Set Path Group ID CCW) to each logical path to the device using a worldwide unique identifier (PGID), or the PGID is just unique in an enterprise or among all hosts that connect to the one or more storage controllers 6a, 6b . . . 6n. The one or more storage controllers 6a, 6b . . . 6n create a path group from the set of logical paths for a device that have the same PGID identifier. Each device has a unique unit address on each logical path, where the device may comprise a logical volume or an alias address.

Each processing system 4a, 4b . . . 4n may comprise a physical machine or a virtual machine, such as a logical partition (LPAR), to which computer resources, such as one or more central processing units (CPUs) and memory resources are assigned. Each processing system 4a, 4b . . . 4n may execute their own operating system 10, device drivers, and may execute channel subsystem 8 code. In further embodiments, each processing system may comprise a logical partition of a processor. In this way, one or more processors in the host 2 may implement multiple logical partitions (LPARs). Multiple processing systems 4a, 4b . . . 4n may share a single logical channel subsystem 8 or different processing systems 4a, 4b . . . 4n may use different logical channel subsystems.

The channel subsystem 8 performs the operations to communicate I/O requests from the processing systems 4a, 4b . . . 4n to the one or more storage controllers 6a, 6b . . . 6n. The operating system 10 uses UCBs and manages I/O requests. A UCB is a unit control block and is also referred to as a device (DEV) or unit address (UA) of a logical control unit (LCU). The channel subsystem 8 obtains the I/O request from the operating system 10. The memory 18, comprised of one or more memory devices, includes information used by the channel subsystem 8 and operating system 10 to manage I/O requests. Each processing system 4a, 4b . . . 4n maintains its own UCB and alias address pool information providing information on the devices accessible through an I/O supervisor 20 by each processing system 4a, 4b . . . 4n. Different processing systems 4a, 4b . . . 4n may have different UCB and alias address pool information having different alias addresses assigned to the base addresses for a particular processing system. Logical control unit information 300 defined on the storage controller defines how the virtualization of the control units is established. For example, if sixteen virtual controls units are defined, the information about these control units would be stored in the logical control unit information 300. While the example mentions only sixteen logical control units, one of skill in the art would appreciate that 256 entities could be defined.

The memory 18 further includes alias address pool information providing information on the assignment of available alias addresses for logical control units for the processing systems 4a, 4b . . . 4n, such that different processing systems 4a, 4b . . . 4n may use the same alias address for different base addresses. The one or more storage controllers 6a, 6b . . . 6n maintain information on the one or more logical volumes 34 configured from the capacity of the physical storage devices 24a, 24b . . . 24n. Each processing system 4a, 4b . . . 4n, can use alias addresses independently from each other (base-alias relationships can be maintained independently on each processing system). In one embodiment, the memory 18 may maintain the UCB information and alias address pool information for all processing systems 4a, 4b . . . 4n in the host 2, which is shared for all processing system operations at the same time. In a further embodiment, each processing system may maintain in its own memory the UCB information and alias address pool information for that processing system 4a, 4b . . . 4n. In one embodiment, there is a separate host memory 18 local to each processing system 4a, 4b . . . 4n operating system image. The memory 28 includes an alias management group 500. While only one alias management group (AMG) 500 is shown in the illustrative example, one of skill in the art can appreciate one more AMG on the memory 28 of the storage controller 6a, 6b . . . 6n.

The one or more storage controllers 6a, 6b . . . 6n memory 28 maintains a relationship of base addresses and alias addresses to logical subsystems, base addresses to logical volumes, and of static alias addresses to base addresses in logical control unit information 300. The channel subsystem 8 or channel subsystem image is configured to define the devices that are accessible through the channel subsystem. The host 2 operating system 10 communicates with the accessible devices to discover the relationships of subchannels to logical volumes or alias addresses and stores information in the UCB information or alias address pool information. As such, both the storage controllers 6a, 6b . . . 6n and the host operating system 10 have a synchronized view of the relationships between base address and alias addresses. In the case of static alias addresses, at any time, there is a one to one relationship between an alias address and a base address. In the case of dynamic aliases, there is a one to one relationship between a set of aliases and a set of base addresses such that any member of the first set can be used for any member of the second set.

The hosts 2 may comprise computational devices known in the art, such as a workstation, mainframe, server, etc. The storage controllers 6a, 6b . . . 6n may comprise a storage subsystem or server, such as an enterprise storage server, storage controller, etc., or other device used to manage I/O requests to attached volumes. The storages 24a, 24b . . . 24n may comprise storage devices known in the art, such as a solid-state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 18 and 28 may comprise a suitable volatile or non-volatile memory devices, including those described above.

Figure 2:
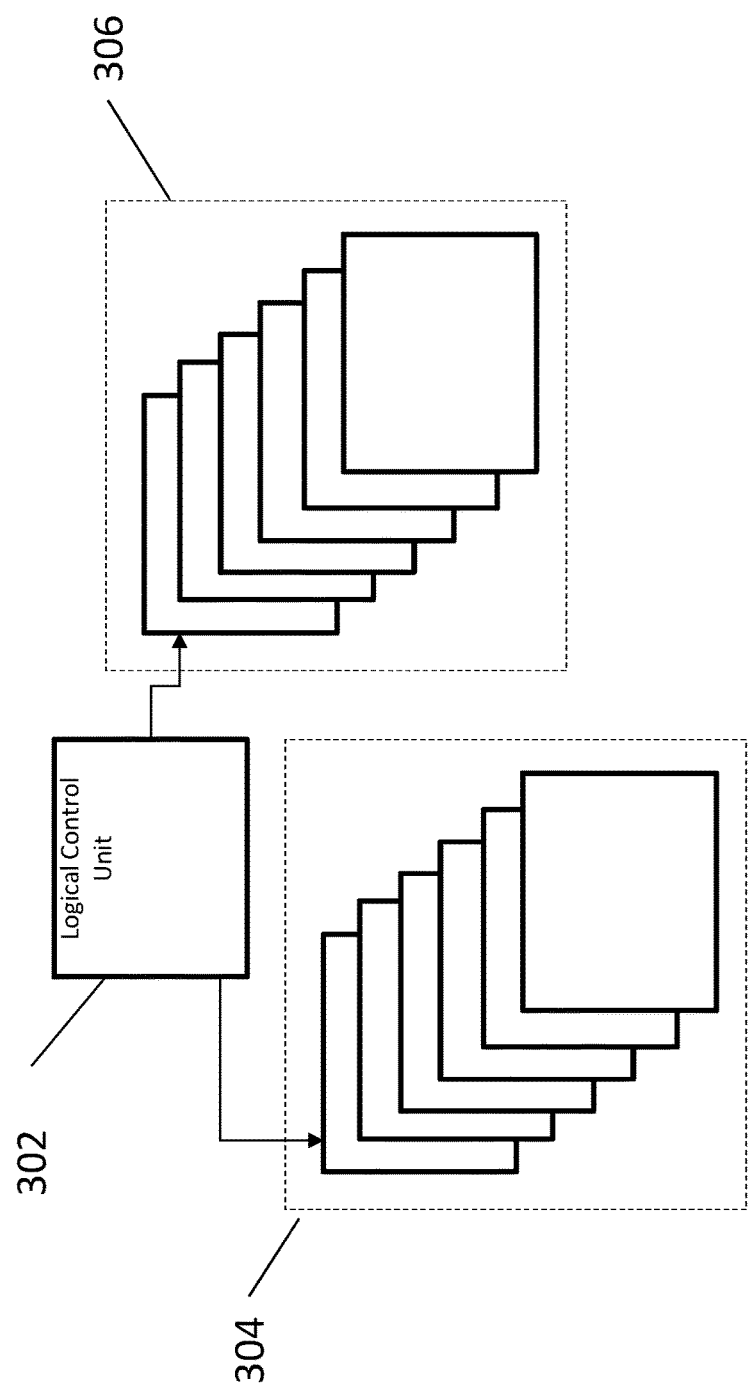
FIG. 2 illustrates embodiments of information a host maintains to access volumes using alias addresses.

FIG. 2 illustrates an embodiment of logical control unit information 300 having information on the assignment of base and alias addresses. The logical control unit information 300 includes an operating system representation of a logical control unit 302, a set of base devices 304 associated with the logical control unit 302, and a pool of alias devices 306 associated with the logical control unit 302.

Figure 3:
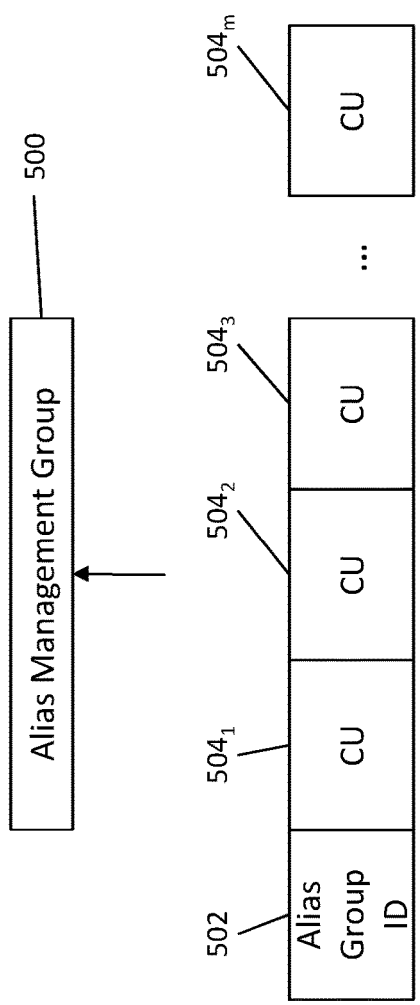
FIG. 3 illustrates an embodiment of an alias management group.
Figure 4:
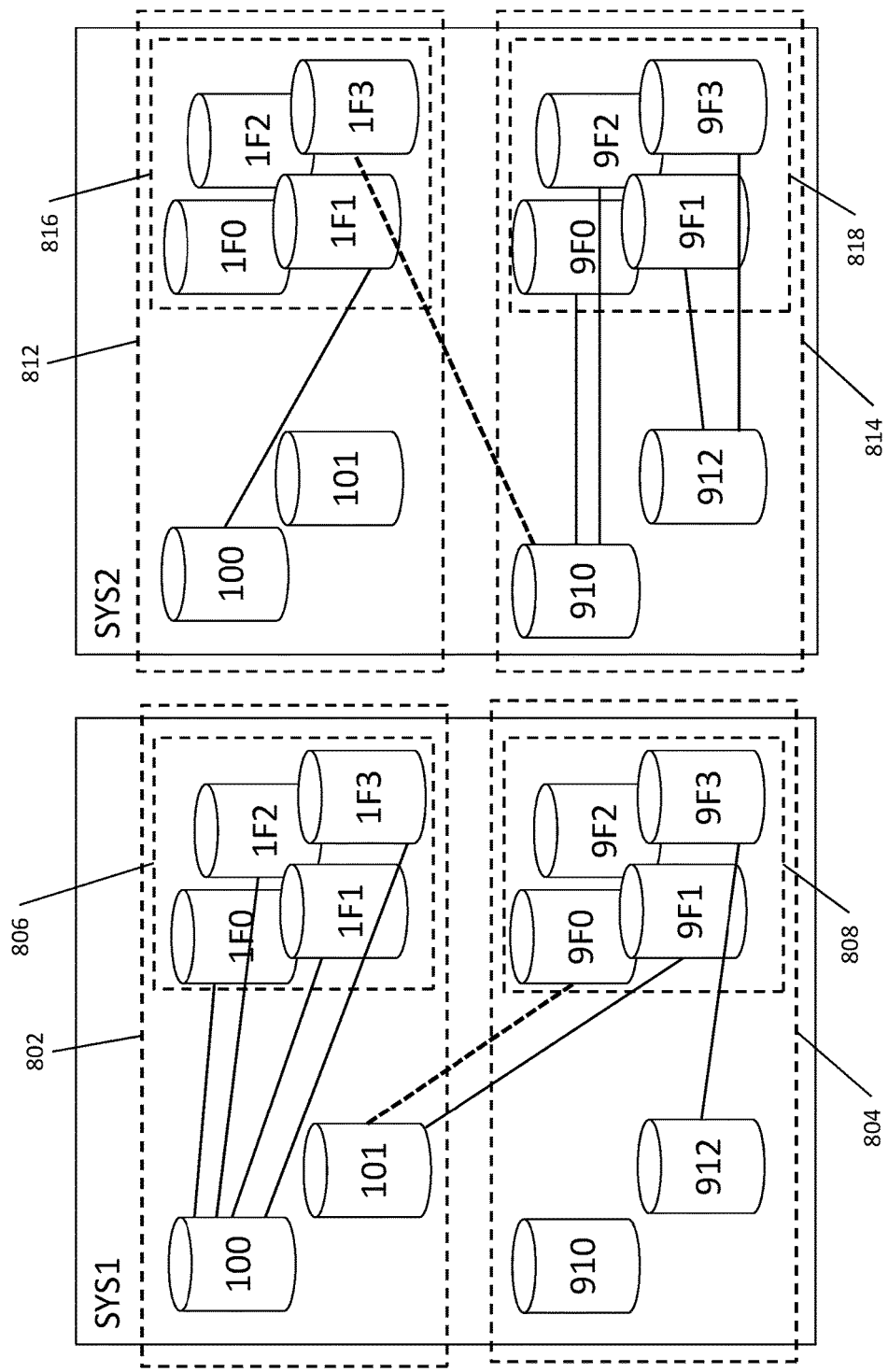
FIG. 4 illustrates a block diagram illustrating borrowing alias devices across control units in a SuperPAV architecture in accordance with one or more embodiments.

FIG. 3 illustrates an embodiment of an alias management group 500 having an alias group identifier (ID) 502 and one or more associated logical Control Units (CUs) 504₁ . . . 504ₘ. For I/O requests using dynamic aliases, any alias address configured on a logical control unit in the alias management group can be used to access any base address configured on a logical control unit in the alias management group. In the illustrated example, only one alias management group is shown, however, in one or more embodiments, multiple alias management groups can be implemented, FIG. 4 illustrates a block diagram illustrating borrowing alias devices across logical control units in a SuperPAV architecture in accordance with one or more embodiments. Parallel access volume (PAV) alias devices provide additional subchannels so that the operating system can start additional I/Os in parallel to each base device. The number of alias addresses per UCB (or base address) can be up to 255 alias addresses. The 255 alias addresses plus the UCB accounts for a total of 256 devices per logical control unit (CU). For ease of illustration in the figures, the alias addresses and the UCB can be referred to as unit addresses (UAs) or devices (DEVs).

As shown in FIG. 4, the block diagram illustrates a host system SYS1 including a first logical control unit labeled 802 containing two base devices (device numbers 100 and 101) and four alias devices (device numbers 1F0, 1F1, 1F2, 1F3) which are grouped in an alias device pool 806. The block diagram also illustrates a second logical control unit labeled 804 containing two base devices (device numbers 910 and 912) and four alias devices (device number 9F0, 9F1, 9F2, 9F3) which are grouped in an alias device pool 808. Although the illustrated example shows logical control units containing two base devices with four alias devices, as mentioned above, a logical control unit can have up to 256 devices. The 256 devices can be a mixture of base devices and alias devices such as, for example, 128 base devices and 128 alias devices.

For an I/O request by system SYS1 for DEV 101, the operating system of SYS1 checks to see if DEV 101 is busy. If DEV 101 is not busy (i.e. performing an I/O), the I/O can be performed at DEV 101. However, if DEV 101 is busy with another I/O request, the operating system of SYS1 would check the alias address pool 806 within the logical control unit 802 first, which contains the four alias addresses to perform the I/O request. As shown in FIG. 4, all the aliases addresses in the alias address pool 806 are busy and shown being utilized for I/O requests to DEV100. When logical control units 802 and 804 are in the same alias management group and the alias management group is enabled for borrowing, the operating system of the first system SYS1 can check the peer alias addresses found in the alias address pool 808 of the logical control unit 804. If any of these aliases in the second alias device pool 808 are available, the available alias device in the second alias device pool 808 is utilized for the I/O request to DEV 101. As shown in the illustrated example, alias device 9F0 is not being utilized for an I/O request and can be utilized for the I/O request for DEV 101 by the operating system of SYS1. Alias address 9F3 is busy, as shown, and being utilized by DEV 912. Alias address 9F1 is also busy being utilized by DEV 101. This borrowing of alias addresses across logical control units (802 to 804) being managed by the same alias management group is further described in FIG. 5.

System SYS2 is shown as performing, via its operating system, I/O requests to the device (DEV) 910. There are two logical control units 812, 814 containing DEVs 100, 101 and DEVs 910, 912 and two pools of alias devices 816, 818, respectively. These may or may not be the same logical control units as shown being accessed by SYS1. DEVs 100, 101 are associated with alias devices (1F0, 1F1, 1F2, 1F3) included in a first alias device pool 816. DEVs 910, 912 are associated with alias addresses (9F0, 9F1, 9F2, 9F3) included in a second alias device pool 818. The operating system for SYS2 sends an I/O request to DEV 910. If DEV 910 is not busy, the I/O request can be performed at DEV 910. However, in the example, DEV 910 is busy as well as the alias addresses in the "local" alias device pool 816 (e.g. 9F0, 9F1, 9F2, 9F3). As these alias addresses are being utilized for I/O requests, the operating system for SYS2 checks the other logical control units being managed by the same alias management group (not shown) which identifies the logical control unit 912 with the first alias address pool 816. For this borrowing to occur, the alias management group must be enabled for borrowing. The operating system of SYS2 identifies alias device 1F3 as being available to perform the I/O request. In the illustrated example, alias devices 1F0 and 1F2 would also have been available to perform the I/O request for DEV 910. System SYS1 and SYS2 can be operating systems, virtual machines, and the like.

Figure 5:
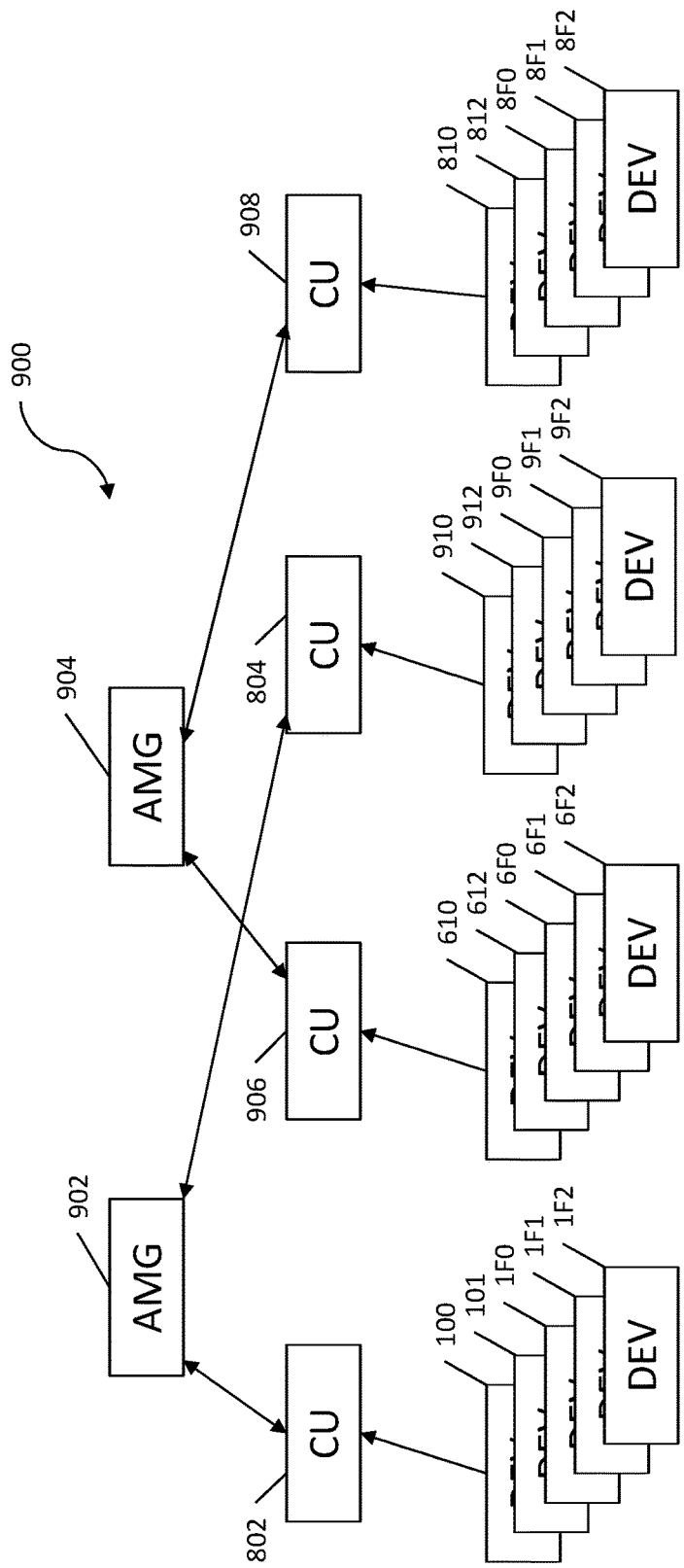
FIG. 5 illustrates a block diagram of a system including alias management groups and associated control units according to one or more embodiment of the present invention.

FIG. 5 illustrates a block diagram of an operating system 900 representation of a subset of possible alias management groups (AMGs) associated with logical control units according to one or more embodiment of the present invention. Shown are two AMGs 902 and 904 that are managed by an operating system for the operating system 900. The two alias management groups (AMGs) 902, 904 contain four logical control units (CU) 802, 804, 906, 908. CU 802 and 804 are peer logical control units and CU 906 and 908 are peer logical control units. Each logical control unit (CU) has a set of devices (DEV) associated with the control units. For logical control unit (CU) 902, the unit addresses associated are DEVs 100, 101, 1F0, 1F1, 1F2. As described above, the DEVs are a combination of base devices (e.g. UCBs) and alias addresses. CU 802 contains two base devices 100, 101 and three alias addresses 1F0, 1F1, 1F2. In other embodiments, the number of devices (DEVs) can be up to a total of 256 devices per control unit in any combination of base devices and alias addresses. The AMGs 902, 904 shown can represent four logical control units on a physical controller, but one of ordinary skill in the art can appreciate that physical controllers can have a plurality of AMGs and logical CUs defined, and a plurality of physical control units can be connected to a single host operating system.

As described in FIG. 4, when an I/O request for a DEV such as 100 or 101 is received, the DEV will perform the I/O if the DEV 100 is not busy or in use. If the DEV 100 is in use, the alias devices 1F0, 1F1, 1F2 within the logical control unit 802 are accessed to perform the I/O. However, if the alias devices within the logical control unit 802 are in use, the operating system attempting to perform an I/O request to DEV 100 in control unit 802 will check the alias management group 902 for a peer logical control unit, such as 804. The peer logical control unit 804 is a logical control unit in alias management group 902. The alias devices (9F0, 9F1, 9F2) in the peer logical control unit 804 will be utilized to perform the I/O for DEV 100. Logical control unit 804 can only be accessed if the alias management group 902 is enabled for borrowing (described below). Should the alias management group 902 not be enabled for borrowing, the I/O request will remain queued until a base device 100 or an alias device 1F0, 1F1, 1F2 becomes available. A similar borrowing of alias addresses can be implemented utilizing AMG 904 with logical control units 906 and 908. Each logical control unit 906 and 908 can have up to 256 DEVs (e.g. base devices and aliases).

In one or more embodiments, before an operating system can access the AMG and borrow aliases from a peer control unit, operating system must be serialized (disabled). When an alias is "borrowed" by an operating system, the central processing unit (CPU) executing the attempt to borrow an alias is disabled for interrupts. Once the operating system process disables, it can validate the system blocks that it must reference to perform the desired action and freely use those blocks until it releases the CPU disablement. During an I/O request, the operating system, while running disabled on a CPU, first checks the base device to see if the I/O can be started. For example, an operating system may try to perform an I/O for base device 100 found in control unit 802. The operating system will check to see if the base device 100 is busy. If the base device 100 is not busy, the operating system will perform the I/O at the base device 100. If the base device 100 is busy, the operating system will check the alias devices 1F0, 1F1, 1F2, 1F3 to perform the I/O. If the alias devices 1F0, 1F1, 1F2, 1F3 in the control unit 802 are unavailable or busy, the operating system will check the AMG 902 for a peer control unit 804. The operating system will first check the AMG 902 to see if the AMG is marked as valid (i.e. enabled for borrowing). If the AMG is marked as invalid or if the AMG pointer is zero, the operating system will not be able to proceed to the peer control unit 804. The I/O request will then be queued and will be deferred until a base or an alias device in the control unit is available to start the I/O. After the I/O is started, or it is determined that it must remain queued, the operating system enables for interrupts on the CPU on which the operating system is executing.

For the case, when the AMG is marked as valid, the processing system will then checks the alias pool of a peer logical control unit, such as CU 804, for available alias addresses 9F0, 9F1, 9F2. In the illustrated example, there are only two control units 802, 804 that are shown; however, one of ordinary skill in the art can ascertain that more than two control units can be included in an AMG. In the case when there are more than two control units in an AMG, when the processing system checks for alias addresses from peer control units, the processing system can check a peer control unit that is one after the previously accessed control unit containing a borrowed alias. A cursor can maintain where the last peer control unit was accessed by the processing system. Over time, an even borrowing scheme will result from accessing a control unit that is one over from the previously borrowed control unit.

In one or more embodiments, the creation and management of the alias management group (AMG) structures are performed by a single thread in each host operating system. This reduces the need for serialization requirements that would exist if multiple threads attempt to make changes to structures simultaneously. This single thread, however, must serialize against operating system attempts to borrow aliases. Thus, exploiting the agreement that disablement is required in order to borrow aliases from peer control units provides a technique of serializing change processing. In one or more embodiment, a technique called BINDBREAK exists such that a process executing on one CPU can request to be suspended until all other CPUs executing in the host operating system have become enabled since the BIND-BREAK request. BINDBREAK is a synchronized CPU enablement program that allows control blocks serialized by disablement to be modified and deleted. BINDBREAK, in one embodiment, sends a remote signal to all other CPUs defined to the host which queues an external interrupt that will be presented when each CPU becomes enabled for interrupts. The sending CPU waits until all other CPUs have processed the remote signal. The thread wanting to make a change to the AMG structure may first set an indicator in the AMG block, invalidating the AMG block for future borrow requests, and subsequently request a BINDBREAK, and upon completion of the BINDBREAK can assume that no operating system process will be attempting to find peer logical control units, since those processes must first disable on their respective CPUs, and then inspect the validity of the AMG structure, finding that it is invalid for peer borrowing. This type of technique allows for fast and efficient serialization of normal operations such as borrowing and returning aliases, and defers the more expensive and less often utilized serialization techniques such as BINDBREAK for changes to the AMG structures.

In one or more embodiments, a rearrangement of the AMG pointers may need to occur due to a change to a path of a control unit. For example, a path change for CU 804 can occur that causes CU 804 to be reassigned to AMG 904. In this instance, the operating system 900 will find the AMGs 902, 904 that need to be changed and will mark the AMGs as invalid. Marking the AMGs as invalid can be accomplished utilizing a flag or any other type of indicator. The operating system process will then perform a BINDBREAK (as described above) to ensure that currently executing disabled operating system processes complete their use of the AMG structures for the AMGs 902, 904. When the BINDBREAK is completed, new operating system processes that disable for interrupts and attempt to access AMGs 902, 904 will see that they have been marked invalid and will not attempt reference the peer logical control units associated with those AMG structures. The changes to the AMG 902, 904 and control unit 804 are completed based on the path changes (described below in FIGS. 6-8). If the AMGs 902, 904 still contain valid logical control units, the AMGs 902, 904 will be marked as valid and new operating system processes that disable for interrupts may then reference these peer logical control units contained in AMGs 902, 904.

However, if an AMG does not have any valid pointers to a control unit, the AMG will need to be deleted. For example, if both CU 802 and 804 were moved to a new AMG, then AMG 902 would require deletion. Knowing that in order to borrow an alias requires that the operating system process be disabled so that it can validate and reference the AMG structure, a second BINDBREAK can be performed by the AMG management thread after it changes the pointer to the existing AMG structure. Once the second BINDBREAK occurs, the AMG management thread can then delete the AMG block, knowing that no logical control unit block will be pointing to the block to be deleted.

The control units (802, 804, 906, and 908) can be reassigned to different alias management groups (AMG) 902, 904 based upon a change to the network path of the control unit, as detected by the operating system 900.

Figure 6:
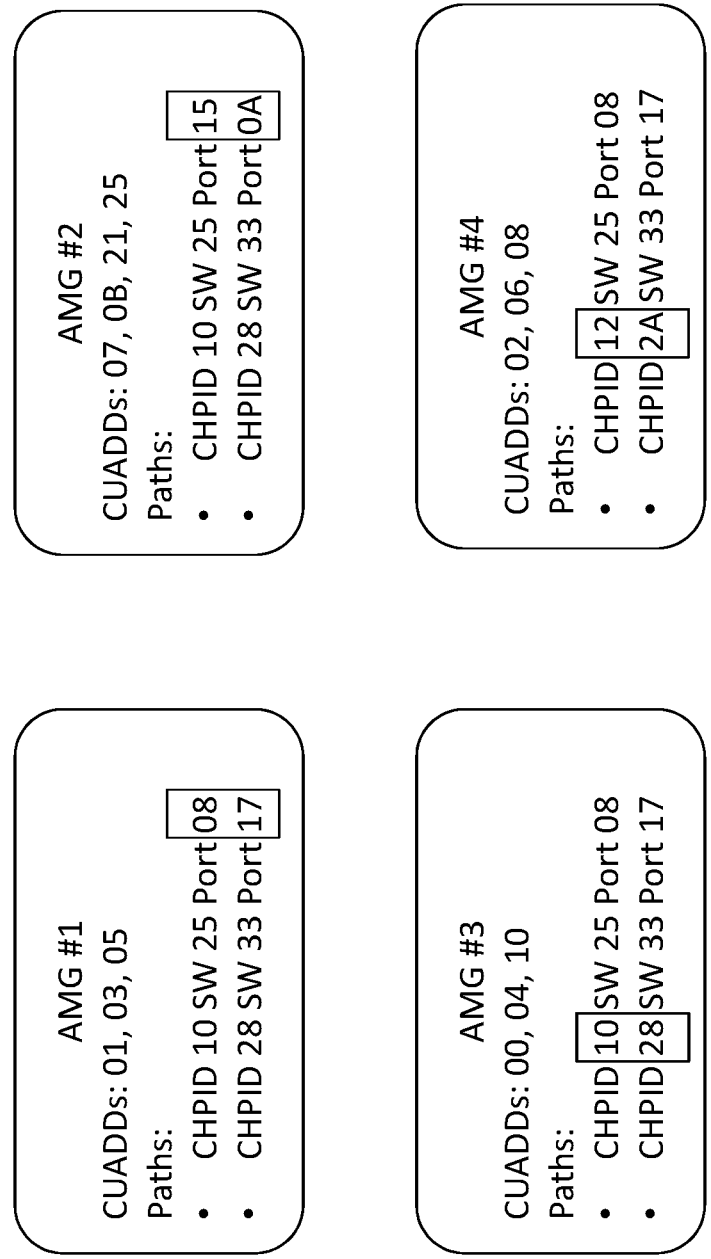
FIG. 6 illustrates a set of four alias management groups, each containing control units according to one or more embodiments of the present invention.
Figure 7:
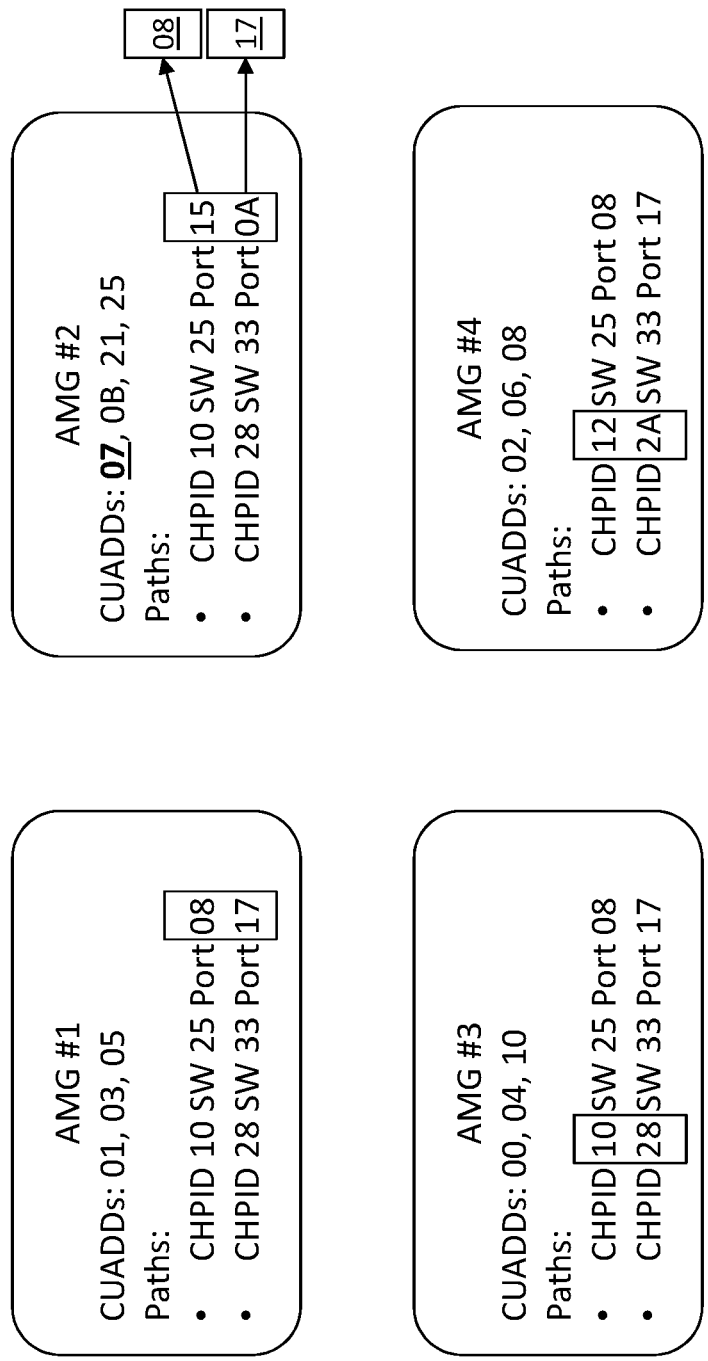
FIG. 7 illustrates a change to the path of a control unit according to one or more embodiments of the present invention.
Figure 8:
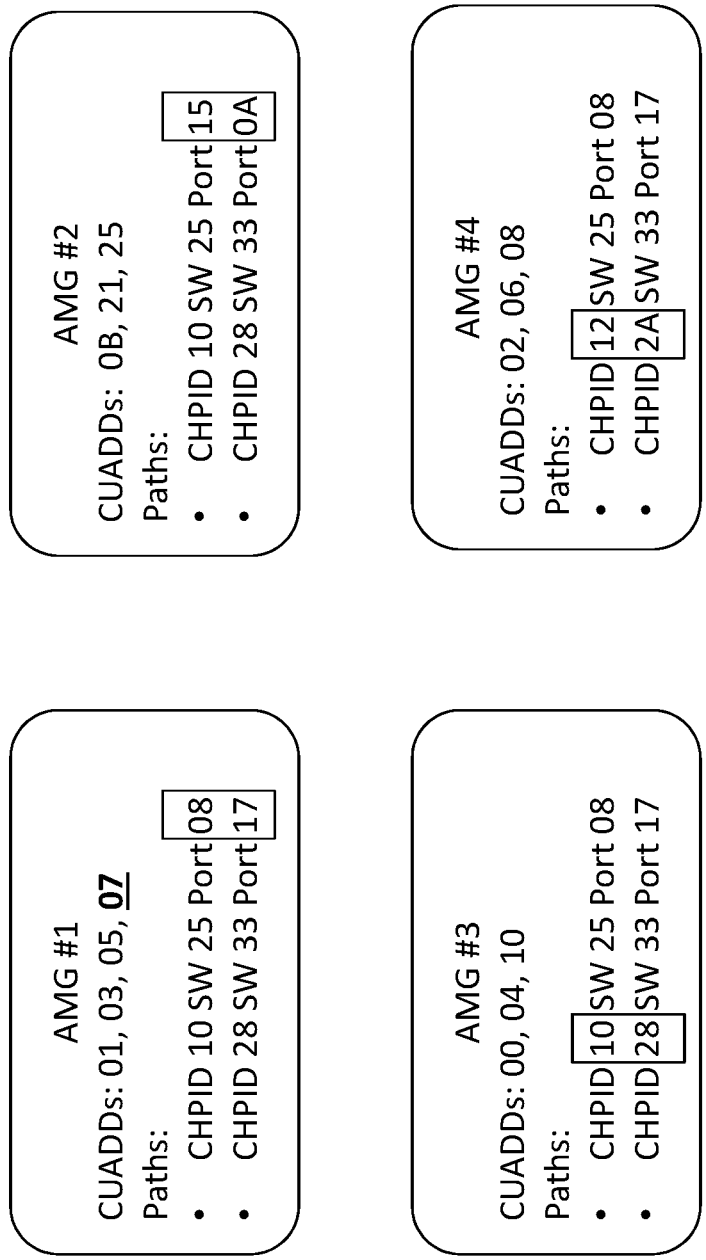
FIG. 8 illustrates the reassignment of control unit 07 from AMG#2 to AMG #1 according to an embodiment.

FIGS. 6-8 illustrate an example of re-assigning a control unit (CU) to a new alias management group (AMG) based on a change to the network path of the control unit.

FIG. 6 illustrates a set of four alias management groups, each containing control units according to one or more embodiments of the present invention. The first alias management group (AMG #1) contains control units 01, 03, and 05. The control units are numbered in a two-digit hexadecimal number system that allows for 256 control units (e.g. 0-255). The CUs in AMG #1 share the paths including CHPID 10 SW 25 Port 08 and CHPID 28 SW 33 Port 17. CHPID is the channel path ID, SW is the switch, and Port is the port number. The second alias management group (AMG #2) contains control units 07, 0B, 21, and 25. The CUs in AMG #2 share the paths including CHPID 10 SW 25 Port 15 and CHPID 28 SW 33 Port 0A. While in AMG#2 the CHPID and the switch are shared with AMG #1, the port number is different indicating a different network path.

FIG. 7 illustrates a change to the path of a control unit according to one or more embodiments of the present invention. As shown in the figure, for control unit 07, the port numbers in the network path are changed from Port 15 and Port 0A to Port 08 and Port 17. The path for control units 0B, 21, and 25 remain the same. For an AMG, the paths for each of the control units are the same and any changes require reassignment of the control unit to either an existing AMG or a newly created AMG for the control unit with the changed path (e.g. CHPID, SW, and Port).

A path change for a control unit can occur based a number of reasons including but not limited to hardware configuration changes due to hardware consolidation, performance improvements for utilization and/or throughput, or hardware failures with any component in an identified path.

FIG. 8 illustrates the reassignment of control unit 07 from AMG#2 to AMG #1 according to an embodiment. In the previous figure, control unit 07 had a path change, specifically the port number changed. Based on this change, the paths found for control units for other AMGs were analyzed to find a matching path for control unit 07. Control unit 07 was reassigned to AMG #1 from AMG #2 based on these matching paths. In another embodiment, if an AMG does not exist for the control unit based on the control unit path, an AMG can be created to manage the control unit.

Figure 9:
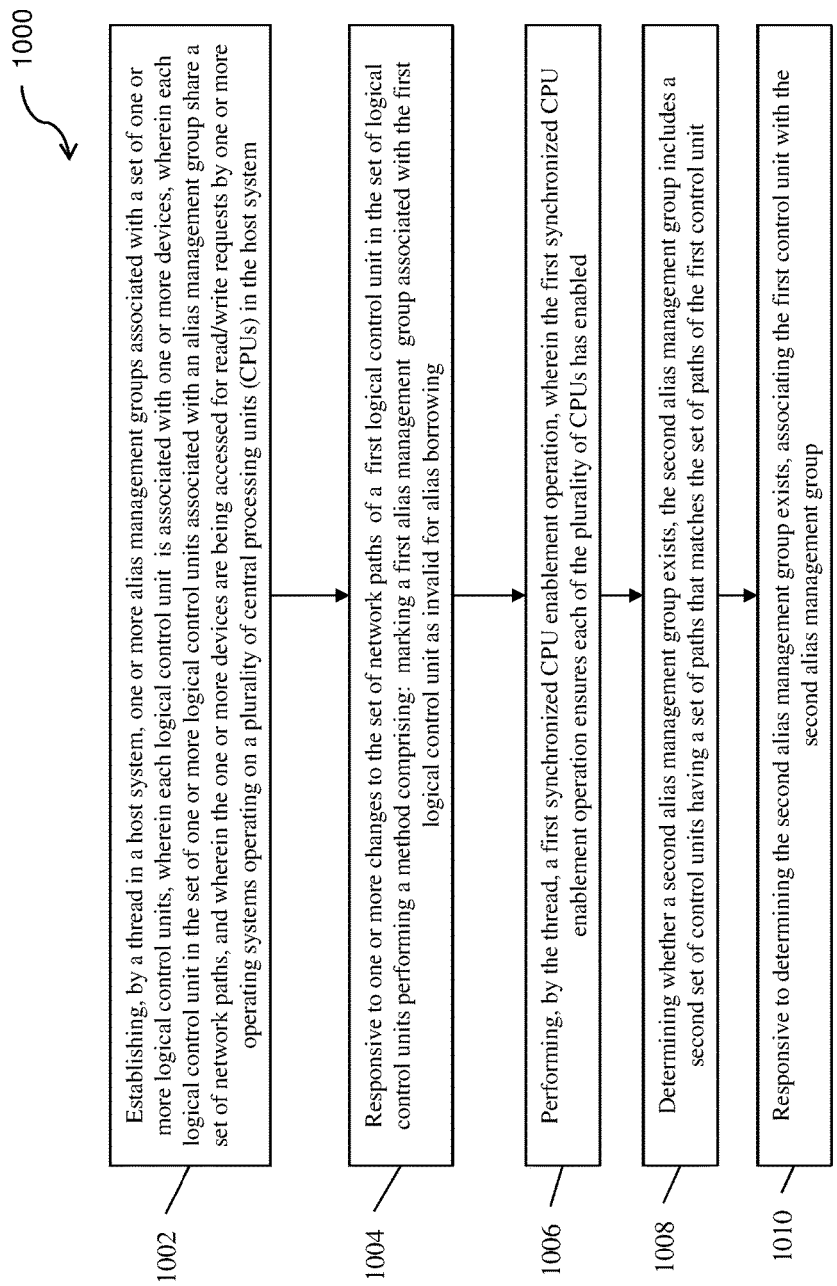
FIG. 9 illustrates a block diagram of a method for managing alias devices across logical control units according to one or more embodiments.

FIG. 9 illustrates a block diagram of a method for managing alias devices across logical control units according to one or more embodiments. The method 1000 includes establishing, by a thread in a host system, one or more alias management groups associated with a set of one or more logical control units, wherein each logical control unit is associated with one or more devices, wherein each logical control unit in the set of one or more logical control units associated with an alias management group share a set of network paths, and wherein the one or more devices are being accessed for read/write requests by one or more operating systems operating on a plurality of central processing units (CPUs) in the host system, as shown at block 1002. Next, at block 1004, the method 1000 includes responsive to one or more changes to the set of network paths of a first logical control unit in the set of logical control units performing a method comprising: marking a first alias management group associated with the first logical control unit as invalid for alias borrowing. At block 1006, the method 1000 includes performing, by the thread, a first synchronized CPU enablement operation, wherein the first synchronized CPU enablement operation ensures each of the plurality of CPUs has enabled. The method 1000 next includes determining whether a second alias management group exists, the second alias management group includes a second set of control units having a set of paths that matches the set of paths of the first control unit, as shown at block 1008. At block 1010, the method includes responsive to determining the second alias management group exists, associating the first control unit with the second alias management group.

Additional processes may also be included. It should be understood that the processes depicted in FIG. 9 represent illustrations, and that other processes may be added or existing processes may be removed, modified, or rearranged without departing from the scope and spirit of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method of managing alias devices across logical control units, the method comprising:
   establishing, by a thread in a host system, one or more alias management groups associated with a set of one or more logical control units, wherein each logical control unit is associated with one or more devices;
   wherein each logical control unit in the set of one or more logical control units associated with an alias management group shares a set of network paths;
   wherein the one or more devices are being accessed for read/write requests by one or more operating systems operating on a plurality of central processing units (CPUs) in the host system; and
   responsive to one or more changes to the set of network paths of a first logical control unit in the set of logical control units, performing a method comprising:
      marking a first alias management group associated with the first logical control unit as invalid for alias borrowing;

performing, by the thread, a first synchronized CPU enablement operation, wherein the first synchronized CPU enablement operation ensures that each of the plurality of CPUs is enabled;

determining whether a second alias management group exists, the second alias management group including a second set of control units having a set of network paths that matches the set of network paths of the first control unit; and responsive to determining that the second alias management group exists, associating the first control unit with the second alias management group.

2. The method of claim 1, further comprising:

responsive to determining that a second management group does not exist, creating a new alias management group; and associating the first logical control unit with the new alias management group.

3. The method of claim 1, further comprising:

determining whether the first control unit was a sole control unit in the first alias management group; and responsive to a determination that the first control unit was the sole control unit in the first alias management group, deleting the first alias management group, wherein deleting the first management group comprises:

performing, by the thread, a second synchronized CPU enablement operation, wherein the second synchronized CPU enablement operation ensures that each of the plurality of CPUs is enabled; and deleting the first alias management group.

4. The method of claim 1, wherein the one or more devices comprise one or more base devices and a set of one or more alias devices.

5. The method of claim 4, wherein the second alias management group comprises one or more logical control units, each logical control unit being associated with a set of one or more base devices and a set of one or more alias devices, and further comprising:

receiving a read/write request for a first base device in the set of one or more base devices, wherein the first base device is associated with a second logical control unit; and analyzing the first base device to determine whether the first base device is busy.

6. The method of claim 5, further comprising:

executing a read/write operating for the first base device, based on a determination that the first base device is not busy.

7. The method of claim 5, further comprising:

responsive to a determination that the first base device is busy, analyzing a second set of alias devices associated with the second logical control unit containing the first base device to determine whether each of the alias devices are busy.

8. The method of claim 7, further comprising:

executing a read/write operation using an alias device that is not busy from the second set of alias devices associated with the second logical control unit for the first base device.

9. The method of claim 7, further comprising:

based on a determination that the second set of alias devices associated with the second logical control unit for the first base device are busy, accessing a third logical control unit in the second alias management group.

10. The method of claim 9, further comprising:

analyzing a third set of alias devices associated with the third logical control unit to determine whether the third set of alias devices are busy.

11. The method of claim 10, further comprising:

executing a read/write operation using an alias device that is not busy from the third set of aliases associated with the third logical control unit from the alias management group.

12. The method of claim 10, further comprising:

based on a determination that the third set of alias devices are busy, accessing a fourth control unit in the second alias management group.

13. The method of claim 10, further comprising:

iteratively accessing a next logical control unit in one or more logical control units in the second alias management group based on a determination that a previous set of alias devices associated with a previous logical control unit is busy.

14. The method of claim 1, wherein the one or more devices comprise one or more base devices.

15. The method of claim 1, wherein the one or more devices comprise one or more alias devices.

16. A computer system for managing alias devices across logical control units, the computer system including a server having a processor, the processor configured to:

establish, by a thread on the processor in a host system, one or more alias management groups associated with a set of one or more logical control units, wherein each logical control unit is associated with one or more devices;

wherein each logical control unit in the set of one or more logical control units associated with an alias management group shares a set of network paths;

wherein the one or more devices are being accessed for read/write requests by one or more operating systems operating on a plurality of central processing units (CPUs) in the host system; and responsive to one or more changes to the set of network paths of a first logical control unit in the set of logical control units, perform a method comprising:

marking a first alias management group associated with the first logical control unit as invalid for alias borrowing;

performing, by the thread, a first synchronized CPU enablement operation, wherein the first synchronized CPU enablement operation ensures that each of the plurality of CPUs is enabled;

determining whether a second alias management group exists, the second alias management group including a second set of control units having a set of network paths that matches the set of network paths of the first control unit; and responsive to determining that the second alias management group exists, associating the first control unit with the second alias management group.

17. The system of claim 16, wherein the processor is further operable to:

responsive to determining that a second management group does not exist, create a new alias management group; and associate the first logical control unit with the new alias management group.

18. A computer program product for managing alias devices across logical control units, the computer program product comprising a computer readable storage medium having program instructions embodied therewith, wherein the computer readable storage medium is not a transitory signal per se, the program instructions executable by a processor to cause the processor to perform a method comprising:

establishing, by a thread in a host system, one or more alias management groups associated with a set of one or more logical control units, wherein each logical control unit is associated with one or more devices;

wherein each logical control unit in the set of one or more logical control units associated with an alias management group shares a set of network paths;

wherein the one or more devices are being accessed for read/write requests by one or more operating systems operating on a plurality of central processing units (CPUs) in the host system; and responsive to one or more changes to the set of network paths of a first logical control unit in the set of logical control units, performing a method comprising:

marking a first alias management group associated with the first logical control unit as invalid for alias borrowing;

performing, by the thread, a first synchronized CPU enablement operation, wherein the first synchronized CPU enablement operation ensures that each of the plurality of CPUs is enabled;

determining whether a second alias management group exists, the second alias management group including a second set of control units having a set of network paths that matches the set of network paths of the first control unit; and responsive to determining that the second alias management group exists, associating the first control unit with the second alias management group.

19. The computer program product of claim 18, further comprising:

responsive to determining that a second management group does not exist, creating a new alias management group; and associating the first logical control unit with the new alias management group.

20. The computer program product of claim 18, further comprising:

determining whether the first control unit was a sole control unit in the first alias management group; and responsive to a determination that the first control unit was the sole control unit in the first alias management group, deleting the first alias management group, wherein deleting the first management group comprises:

performing, by the thread, a second synchronized CPU enablement operation, wherein the second synchronized CPU enablement operation ensures that each of the plurality of CPUs is enabled; and deleting the first alias management group.

* * * * *